(12) United States Patent
Voliani et al.

(10) Patent No.: US 10,124,407 B2
(45) Date of Patent: Nov. 13, 2018

(54) HOLLOW NANOPARTICLES HAVING A MODULABLE METAL CORE

(71) Applicant: FONDAZIONE ISTITUTO ITALIANO DI TECNOLOGIA, Genoa (IT)

(72) Inventors: Valerio Voliani, Leghorn (IT); Vincenzo Piazza, Poggibonsi (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 0 days.

(21) Appl. No.: 15/547,606

(22) PCT Filed: Mar. 2, 2016

(86) PCT No.: PCT/IB2016/051168
§ 371 (c)(1),
(2) Date: Jul. 31, 2017

(87) PCT Pub. No.: WO2016/139591
PCT Pub. Date: Sep. 9, 2016

(65) Prior Publication Data
US 2018/0036799 A1 Feb. 8, 2018

(30) Foreign Application Priority Data

Mar. 4, 2015 (IT) ................ FI2015A0058

(51) Int. Cl.
| | | |
|---|---|---|
| *B22F 1/00* | (2006.01) | |
| *B22F 1/02* | (2006.01) | |
| *B22F 9/24* | (2006.01) | |
| *B22F 9/20* | (2006.01) | |
| *C01B 33/18* | (2006.01) | |

(52) U.S. Cl.
CPC .......... *B22F 1/0051* (2013.01); *B22F 1/0018* (2013.01); *B22F 1/0062* (2013.01); *B22F 1/02* (2013.01); *B22F 9/20* (2013.01); *B22F 9/24* (2013.01); *C01B 33/18* (2013.01); *B22F 2301/255* (2013.01); *B22F 2304/05* (2013.01); *B22F 2998/10* (2013.01); *B22F 2999/00* (2013.01)

(58) Field of Classification Search
CPC .... B22F 1/0051; B22F 1/0018; B22F 1/0062; B22F 1/02; B22F 9/20; B22F 9/24; B22F 2301/255; B22F 2304/05; B22F 2998/10; B22F 2999/00; C01B 33/18
USPC ........................................................ 428/402
See application file for complete search history.

(56) References Cited

U.S. PATENT DOCUMENTS

2014/0221199 A1    8/2014   Devi et al.

FOREIGN PATENT DOCUMENTS

| CN | 102019431 | * | 4/2011 |
| CN | 102019431 A | | 4/2011 |

OTHER PUBLICATIONS

Xiaotong Wu et al: "Multifuncional shperical gold nanocluster aggregate . . . " Journal of Materials Chemistry B, vol. 3, No. 12, Jan. 1, 2015, pp. 2421-2425.*
Bommel Van et al: "Poly(L-lysine) aggregates as templates for the formation of hollow silica shperes", Advance Materials, Wiley-VCHVerlag GMBH&CO. KGAA, DE, vol. 13, No. 19, Oct. 2, 2001, pp. 1472-1476.*
Yuyong Yin et al: "A general and feasible method for the fabrication of functional nanoparticles . . . " Journal of Materials Chemistry, vol. 22, No. 22, Jan. 1, 2012, pp. 11245.*
Isabel Freitag et al: "Preparation and characterization of multicore SERS labels by controlled aggregation of gold nanoparticles", Vibrational Spectroscopy, Elsevier Science, Amsterdam, NL, vol. 60, Feb. 20, 2012, pp. 79-84.*
Bommel et al.,"Poly (L-lysine) Aggregates as Templates for the Formation of Hollow Silica Spheres", Advanced Materials, 2001, vol. 13, No. 19, pp. 1472-1476.
Freitag et al., "Preparation and characterization of multicore SERS labels by controlled aggregation of gold nanoparticles", Vibrational Spectroscopy, 2012, vol. 60, pp. 79-84.
Luo et al., "From Aggregation-Induced Emission of Au(I)-Thiolate Complexes to Ultrabright Au(O)@Au(I)-Thiolate Core-Shell Nanoclusters", Journal of the American Chemical Society, 2012, vol. 134, No. 40, pp. 16662-16670.
Wu et al., "Multifunctional spherical gold nanocluster aggregate@polyacrylic acid@mesoporous silica nanoparticles for combined cancer dual-modal imaging and chemo-therapy", Journal of Materials Chemistry B, 2015, vol. 3, No. 12, pp. 2421-2425.
Yin et al., "A general and feasible method for the fabrication of functional nanoparticles in mesoporous silica hollow composite spheres", Journal of Materials Chemistry, 2012, vol. 22, No. 22, pp. 11245-11251.
International Search Report and Written Opinion for International Application No. PCT/IB2016/051168 (dated May 9, 2016)(11 Pages).

* cited by examiner

*Primary Examiner* — Leszek B Kiliman
(74) *Attorney, Agent, or Firm* — Lucas & Mercanti, LLP (57) ABSTRACT

The present invention relates to hollow nanoparticles having inside their cavity a metal core constituted by metal seeds agglomerated with a cationic polyelectrolyte, useful in medicine as well as in the bio-imaging and/or radio-therapeutic or chemo-therapeutic techniques and also in the industry as starting materials for preparing catalysts or metamaterials in non-linear optical processes.

15 Claims, 6 Drawing Sheets

HOLLOW NANOPARTICLES HAVING A MODULABLE METAL CORE

CROSS-REFERENCE TO RELATED APPLICATIONS

This application is a 371 of PCT/IB2016/051168, filed Mar. 2, 2016, which claims the benefit of Italian Patent Application No. FI2015A000058, filed Mar. 4, 2015.

FIELD OF THE INVENTION

The present invention relates in general to the field of nanomaterials, and more precisely it relates to hollow nanoparticles having a modulable metal core inside the cavity, useful in medicine as therapeutic agents, in the bio-imaging techniques as well as in industry as starting material for preparing catalysts or metamaterials in non-linear optical processes.

STATE OF THE ART

The unexpected properties of the metal nanoparticles have made possible in recent years the development of innovative therapeutic and diagnostic agents, extremely effective and customised. Exemplary are the various nanostructures proposed as contrast media for the visualization of tissues or of organs in vivo, for the target transport of molecules inside cells, or for therapies based on photothermal effects or on increment of X rays.

Despite their intriguing quality and high expectations, no noble metal nanoparticle was able to be developed from animal models to an actual human use. In fact, for this use in humans to be possible, it is required that the nanoparticles, after having performed their diagnostic or therapeutic action in a human organism, are completely eliminated from this organism in a reasonable time. This requirement was historically been set by the US Food and Drug Administration for any kind of chemotherapeutic agent, and it is now standardized.

The more efficient route of elimination of the agents injected into the human body is recognized to be the route of renal excretion, which is controlled by the filtration through the renal glomeruli and showed a threshold value of maximum 8 nm for the size of particles to be expelled. Objects of greater size may be eliminated through other routes of excretion from the human body, namely through the liver, or the spleen, respectively in the bile and in faeces. The excretion route through the liver is particularly suitable for capture and elimination of biological material having a hydrodynamic diameter of 10-20 nm, such as viruses. The excretion route through the spleen is instead formed by inter-endothelial slits in venous sinuses, with dimensions of the slits in the order of 200 nm; through these slits in theory particles of dimensions greater than the above mentioned 8 nm could also be eliminated. But unfortunately, the excretion of intact metal nanoparticles through these routes is actually an extremely slow and inefficient process, thus causing an accumulation of metals in the organism and increasing, therefore, the probability of generating toxicity in the long term. Hence there is the need of the aforementioned stringent requirement for the size of the nanoparticles injectable into the human body, recognized in maximum 8 nm.

Another drawback to be considered in the biomedical use of metal nanoparticles, if retained in the organism, regards their possible interaction and/or interference with the commonly used medical-diagnostic techniques, such as the radiological techniques. For instance, a radiological examination could be particularly sensitive to metals of high atomic number accumulated in a patient's organs, so that the metals would interfere with the X rays image because of changes produced in the linear attenuation coefficients. Another example is represented by the magnetic resonance, wherein the zones without protons created by the accumulated metals with high atomic number, would produce a significant interference, or further an examination with ultrasound would be affected by the increased echogenicity or a tomographic examination by positron emission tomography (PET) would be affected because of a photons' attenuation (see for instance *Pharmacol. Rev.* 53:283-318, 2001). It is therefore essential, also to avoid interference with other commonly used diagnostic techniques, that the metal nanoparticles injected into a human body be completely excreted from it after having served their function.

Moreover, if the size of the metal nanoparticles used are below 3 nm, their chemical, physical and physiological properties could be altered or even lost. For instance, gold nanoparticles having diameter lower than 2 nm lose their characteristic plasmon resonance and, because of the high ration surface/volume, the surface activities may also compromise possible applications of these nanoparticles. Besides this, their excretion from the organism is so rapid as to render impossible the accumulation required in a tissue, such as in case of a tumour. Hence, in the field it is felt the need to have available not only metal nanoparticles of ultra-small dimensions, but to have available this kind of nanoparticles also having good chemical and physical properties for their possible application, in particular for the medical applications.

In view of what said above, it is evident how in the biomedical field it is critical to have available metal nanoparticles of a well-determined size, biodegradable and with definite chemical-physical characteristics, and therefore to have available processes for their preparation.

Also in other fields, for instance in the field of catalysis, the metal nanoparticles, in particular gold nanoparticles, have recently attracted much attention of researchers because of their unexpected ability to catalyse a number of different reactions, among these the water gas shift reaction, the catalytic combustion of methanol, the oxidation of alcohols and aldehydes, the epoxidation of propylene, the hydrochlorination of acetylene, the formation of carbon-carbon bonds, and so on. These nanomaterials have often shown the form and size of a polydisperse system, and therefore a behaviour of heterogeneous catalysis. Furthermore, in order to render stable the nanostructures in the reaction media used, it is always necessary a coating of the metal nanoparticles. Such coatings are organic molecules that link to the surface of the metal particles with a strong interaction, for instance an interaction gold-thiol, reducing however in this way the catalytic efficiency of the metal surface. Therefore, also in the field of catalysis, for the metal nanoparticle to be high-performing their size and form must well defined and controlled and moreover they must have a "naked" metal surface, or better they must have a sufficiently stable structure so that it is not required a coating that could reduce the catalytic efficiency.

In the US patent application published with No. US 2014/0221199 a process is described for the preparation of metal or metal alloy clusters, not agglomerated and of ultra-small dimensions, lower than 5 nm, encapsulated in silica particles of 20-30 nm of diameter. The use disclosed for these clusters encapsulated in silica is in the catalysis and in the bio-imaging techniques, while the process used to obtain them consists in the preparation of metal clusters in the form of metal thiolate by means of the so-called modified Brust method, followed then by the encapsulation in silica of the so obtained metal thiolate clusters. By calcination at 350° C. the capsule of silica becomes porous; even if US 2014/0221199 states that porous silica allows the metal aggregates to exert their catalytic activity, their inclusion in solid and dense glass matrices makes the metal surface difficult to be reached by reactants, thus reducing their catalytic activity. Xiaotong Wu et al. in Journal of Material Chemistry B, vol. 3, n. 12, pages 2421-2425, describe a process for the synthesis of gold nanoclusters encapsulated by nanoparticles having a polyacrylic acid/mesoporous silica shell, with enhanced fluorescence properties, for the use in chemotherapy and in fluorescence/X ray computed tomography imaging.

As far as the Applicant is aware of, to date it has not been developed a process for the preparation of metal nanoparticles that is reproducible and able to control the size of the prepared nanoparticles, which allows obtaining nanoparticles with useful characteristics for therapeutic and/or diagnostic applications, excretable through the renal route, and at the same time useful for preparing stable nanostructures also in the reaction media used in the industrial catalysis even without functionalization of the metal with molecules that would then reduce its catalytic efficiency. In view of what said above, the need of having available such a process of preparation is still strongly felt.

SUMMARY OF THE INVENTION

Now the Applicant has found a novel process for the preparation of hollow nanoparticles of silica, having in their cavity a metal core comprising metal seeds negatively charged aggregated with a cationic polyelectrolyte. Such process allows to prepare nanoparticles of well-defined size and characteristics, also able to interact as a single body in respect of cells and tissues when used for instance in the bio-imaging techniques, but also able to be biodegraded in their own components in few hours so that they are not retained for a long time in the human body, but they are excreted rapidly through the renal route. In the same way such nanoparticles, if subjected to appropriate calcination, yield hollow permeable nanoparticles, with a single central metal core that may have an efficacious catalytic action; such nanostructures are, in fact, highly stable also without functionalization of the metal, that would reduce their catalytic efficiency, as illustrated above for the known processes.

It is therefore a subject of the invention a process for the preparation of hollow silica nanoparticles, having size comprised between 30 and 500 nm and a metal core inside their cavity comprising seeds of a metal, each of size equal or lower than 6 nm, in the form of an aggregate, the essential features of said process being defined in the first of the attached claims.

A further subject of the present invention is represented by an intermediate in said process of preparation, as defined in the claim 10 here attached.

Hollow nanoparticles of size comprised between 30 and 500 nm obtainable by the aforesaid process and having in their cavity an aggregate of metal seeds each of size lower or equal to 6 nm, as defined in the claim 12 here attached, and their use as diagnostic and/or therapeutic agents, and as starting material in a process for preparing catalysts, represent a further subject of the invention.

Further important characteristics of the process of preparation of the invention and of the nanoparticles obtained by this process are described in the following detailed description.

BRIEF DESCRIPTION OF THE FIGURES

The FIG. 1 shows sequentially the products that form in the process of the invention, schematically in the upper part a) of the Figure while in the lower part b) are shown the micrographies obtained with a Transmission Electron Microscope (TEM) for the products prepared in the following Examples from 1 to 4.

The FIG. 2 shows two graphs of diameter distribution obtained by analysis on at least 100 nanoparticles observed with TEM for a) the gold seeds of the following Example 1, and for b) hollow silica nanoparticles with aggregates of metal seeds and polylysine with molecular weight 15-30 kDa of Example 3.

The FIG. 3 shows the UV-Visible absorption spectra recorded for the products obtained in the following Examples 1-4, i.e. for the gold seeds of Example 1 (–+–), for the aggregates with polylysine (PL) 15-30 kDa of Example 2 (– – –), for the hollow silica nanoparticles with such aggregates of Example 3 (– – –), for the nanoparticles after calcination of Example 4 (+++).

The FIG. 4 is a panel that collects data coming from the analysis of diameter distribution by analysis on at least 100 hollow silica nanoparticles with aggregates of metal seeds formed with polylysine of different length according to the invention, observed with TEM, obtained as described in the following Example 3. Polylysine of 1-5 KDa (–+–), 4-15 KDa (– – –), 15-30 KDa (– – –) and 70-130 KDa (+++) has been used.

The FIG. 5 shows an extinction spectrum of hollow silica nanoparticles with aggregates of metal seeds and polylysine 15-30 kDa modified by the fluorescent probe Alexa680 of Example 3.

The FIG. 6 shows a spectrum obtained by Raman spectroscopy amplified by surfaces (SERS) for the same nanoparticles of FIG. 5.

DETAILED DESCRIPTION OF THE INVENTION

The process for the preparation of hollow silica nanoparticles having a "modulable" metal core according to the present invention comprises the following steps:

i) synthesis of seeds of a metal in the form of a complex with an aromatic anionic polyelectrolyte by reduction with sodium borohydride of a salt or of an acid of the metal in aqueous solution in the presence of said anionic polyelectrolyte;

ii) synthesis of an aggregate of a cationic polyelectrolyte having ammino or quaternary ammonium groups with the above said seeds of a metal, by addition of an aqueous solution of said cationic polyelectrolyte to the aqueous solution of seeds of a metal as obtained in step i);

iii) formation of said hollow silica nanoparticles having in the cavity a metal core comprising the above said seeds of a metal in the form of an aggregate by hydrolysis of tetraethyl orthosilicate catalysed by ammonia in a mixture of ethanol and water in the presence of the aggregate as obtained in step ii).

By the present process it is possible to synthesise nanoparticles of definite size constituted by a hollow nanostructure of silica in which are incorporated metal seeds, negatively charged for the complexation of the metal with an anionic polyelectrolyte, such seeds being hold together inside the cavity as an agglomerate having a well-defined geometric shape, determined by the choice of a positively charged polymer that enfold the seeds. In this system each component is tightly linked to the others, as to obtain an extremely stable structure, able to reach the target tissues in a human body, to produce the desired diagnostic and/or therapeutic action, then to degrade and be eliminated as single components through the renal route.

By the term "modulable" referred to the metal core of the nanoparticles of the invention is just meant a metal core that is an agglomerate of metal seeds that behaves as a single body for instance as far as the optic behaviour is concerned, but it can be degraded in the single components in a human organism. At the same time this metal core, if subjected to a calcination process under the conditions better specified in the following, yields to a naked nanosphere of the metal, having an extremely reactive surface that makes the nanoparticles useful as catalyst. The structure as well as the properties of the present nanoparticles are therefore "modulable" depending on their application and different function that they have to perform.

The hollow external structure of the present nanoparticles, made of silica, protects the metal core from the external environment, is perfectly biocompatible and biodegradable, and may be easily coated or functionalised with biomolecules.

In the present invention by the term "metal" is meant for instance a metal selected in the group consisting of gold, silver, platinum and copper.

The seeds of a metal in the core of the present nanoparticles are preferably of a metal selected from the group consisting of gold, silver and platinum. According to a particularly preferred embodiment of the invention, the metal is gold. In the process of the invention the metal seeds are prepared in water by reduction in step i) of appropriate salts or acids of the metal in the presence of a biocompatible, aromatic, anionic polyelectrolyte, such as polystyrene sulphonate; it is thus formed a complex of the metal with the polymer that gives to the metal a negative charge able to interact with the positive charge of a cationic polyelectrolyte, such as the polylysine, creating a compact metal agglomerate wherein the metal seeds are enfolded with the cationic polyelectrolyte, around which is the hollow silica nanosphere.

According to the invention as cationic polyelectrolyte having primary, secondary or tertiary ammino groups, or quaternary ammonium groups, polylysine is preferred, whose use in the present process forms with the metal seeds an agglomerate of substantially spherical shape, having optical properties proved to be almost identical to those of a sphere of the same metal.

According to a preferred embodiment of the present process, the anionic polyelectrolyte is polystyrene sulphonate and the cationic polyelectrolyte is polylysine.

In the present invention by the term "ε-poly-D-L-lysine", or more simply polylysine, is meant the polymer of the aminoacid D-lysine or L-lysine with a molecular weight ranging between 1 and 130 kDa. It is a very often used polymer in medicines and in the food industry and therefore it is already acknowledged and certified as a safe product (or Generally Recognised as Safe, GRAS). Preferably, in the present process it is used polylysine with molecular weight ranging between 15 and 30 kDa.

In a particular embodiment of the present invention, the cationic polyelectrolyte used, such as the polylysine, may be modified to the extent up to 10% of its weight with functional molecules, as fluorophores or molecules having pharmacological activity, so as to obtain at the end of the process hollow nanoparticles with a metal core functionalized with molecules useful for the specific application to be achieved. It has been verified in particular for the polylysine that such modifications to the extent up to 10% do not give rise to the loss of agglomerating ability of the polymer. Nanoparticles can be thus obtained having theranostic effects, i.e. particles able to act as diagnostic and therapeutic agents at the same time, as nanoparticles simultaneously useful as diagnostic agents in photoacoustic or magnetic imaging techniques, and as therapeutic agents by means of photothermal effect or increase of X ray in radiotherapy. Examples of fluorophores of possible use are the fluorescent probes Alexa Fluor® (Molecular Probes Inc.); an example of pharmaceutically active molecules is doxorubicin, and an example of magnetic probes is the complex gadolinium-tetraazacyclo dodecanetetraacetic acid (o Gd-DOTA).

Also the external surface of the hollow nanoparticles can be easily modified and functionalized in the process of the present invention, and this can be achieved by standard protocols. The surface modification may be obtained with various silanizating polymers or peptides, and preferably with amino-PEG-silane 2 kDa. Once modified, the surface can be on its turn functionalized with various biomolecules, such as antibodies, aptamers, fluorophores, proteins, etc. selected depending on the target to which the nanoparticles have to be directed, by means of standard protocols, for instance by techniques of the so-called "click-chemistry" or of peptide chemistry.

The final structure of the hollow nanoparticles obtainable with the process of the invention has size ranging between 30 and 500 nm, preferably between 60 and 110 nm, while the metal seeds inside the cavity of these nanoparticles have size equal or lower than 6 nm, for example ranging between 3 and 6 nm, preferably ranging between 3 and 4 nm, and typically their number is averagely comprised between 20 and 500 seeds for each nanoparticle.

According to a particularly preferred embodiment of the invention, the nanoparticles are prepared by the present process with size of approximately 100 nm, such size being proved optimal to improve the internalization in the cells of the tissues and just the possibility to reach the target tissue. It is however important to note that the present process allows in any case to prepare nanoparticles in the range of size between 30 and 500 nm, under a strict control of the monodispersion in such range.

These nanoparticles can be used as contrast agent, diagnostic and/or therapeutic agents, in in vivo imaging techniques, following administration, for instance by enteral or preferably parenteral route, in the human body where, after a certain period of time during which the nanoparticles are internalized in the cells of the target tissues, they are then degraded releasing the single components, among which are polyelectrolytes, silicic acid and the metal seeds that have maximum size of 5-6 nm and can be therefore eliminated without problems through the renal route. Examples of possible applications of this kind for the present nanoparticles are in photoacoustics, or in radiotherapy.

These nanoparticles can moreover be used as starting material in a process for the obtainment of catalysts by calcination carried out at temperatures comprised between 200 and 800° C. in a period of time ranging between 2 and 10 hours, and preferably by heating the material for a time of overall 6 hours with a ramp of temperature between 200 and 600° C. After calcination under the aforementioned conditions, the present hollow nanoparticles with a core of metal seeds agglomerated with polylysine yield to hollow nanoparticles wherein the metal core is constituted by a single "naked" sphere inside the cavity, without polylysine, and the inert oxide that is the external envelope of the nanoparticle has become porous and permeable, so as to allow the internal metal core to perform its catalytic function. The single metal sphere inside these nanoparticles has size comprised between 10 and 100 nm, and preferably between 15 and 25 nm. Thanks to the fact of being "naked", i.e. without any functionalization, the metal is completely available to perform its catalytic activity, thus guaranteeing the maximum efficiency obtainable for that given metal. Examples of processes wherein the present calcinated nanoparticles can be used as catalysts include the water gas shift reaction, and the catalytic combustion of methanol.

The hollow nanoparticles obtainable by the present process, after calcination, are furthermore useful as metamaterials in non-linear optics applications.

In fact, following calcination of the nanoparticles obtainable by the present process, at temperatures comprised for example between 200 and 800° C., and preferably equal to approximately 600° C., while the external shell remain practically intact but acquiring a higher permeability, the polymers present in the core are oxidized to the constituent elements (water, carbon dioxide, etc.) that come out from the particle, and the metal seeds are fused to create a sole, single metal sphere. This sphere, the temperature returns to the room temperature value, solidifies creating a sole metal nanoparticle inside the cavity of inert oxide, having a size that depends on the number of metal seeds subjected to calcination. Starting from nanoparticles having size of approximately 100 nm that can contain a number of metal seeds of about 300, after calcination a metal sphere of 15-30 nm is obtained. These metal spheres are completely "naked", without polylysine and any other functional molecule previously present, therefore they are extremely reactive, but also stable thanks to the protective external shell.

The advantages of the process of the present invention are therefore manifold: firstly the process allows a strict control of the size of the particles in each steps of the synthesis; it also allows to obtain nanoparticles that, once performed their function in the human body as diagnostic and/or therapeutic agents, are degraded in components of such dimensions as to be easily and rapidly excreted through the renal route; the present process allows possible functionalizations, if desired, in the metal core, where the polylysine can be bound to pharmaceutically active molecules or to fluorophores, and on the external surface of the hollow nanosphere, which can be functionalized with various molecules, such as antibodies, aptamers, fluorophores, etc. by standard protocols. It is moreover an extremely simple process, inexpensive and reproducible.

The nanoparticles obtainable by the present process can be subjected to lyophilization and, in the lyophilized form, they can be stored for a long time without losing their properties. Finally, they can be used as such for the above said biomedical applications, but they can also be used as starting material for the preparation, by a simple calcination under appropriate conditions, of novel catalysts that are very stable and efficient or for the preparation of metamaterials useful for applications in nonlinear optics.

The following non-limiting examples of the present invention are given with illustration purposes.

EXAMPLE 1

Synthesis of the Metal Seeds

Gold seeds have been prepared according to the following procedure. To 20 ml of milliQ water have been added 10 μl of a 30% aqueous solution of poly(sodium-4-styrensulphonate) and 200 μl of an aqueous solution of $HAuCl_4$. The reaction mixture was then vigorously stirred and, during stirring, 200 μl of an aqueous solution of sodium borohydride (4 mg/ml in milliQ water) have been rapidly added, then the mixture was maintained under stirring for further 2 minutes. After the addition of $NaBH_4$, the solution has changed colour several times finally becoming bright orange. Before use, this solution was generally left to stand for at least 30 minutes and used then without any further purification.

EXAMPLE 2

Synthesis of the Aggregates of Metal Seeds

In a 2 ml plastic vial 1 ml of the solution of gold seeds prepared as described above in Example 1 was poured, then 40 μl of an aqueous solution of polylysine (5 mg/ml in water, polylysine with PM 15-30 kDa). Stirring at room temperature was performed for 30 minutes. The so formed gold aggregates were then collected by centrifugation at 13400 rpm for 3 minutes, re-suspended in 100 μl of milliQ water and subjected to sonication for maximum 4 minutes.

EXAMPLE 3

Synthesis of Hollow Nanoparticles Containing Metal Aggregates

In a 100 ml round-bottom flask were poured 70 ml of absolute ethanol and 2.4 ml of a 30% aqueous solution of ammonium hydroxide, then 40 μl of tetraethyl orthosilicate (TEOS, 98%). The so obtained reaction mixture was maintained under stirring for 20 minutes at room temperature, then 2 ml were added of the aqueous solution of gold aggregates prepared as described above in Example 2, and the reaction mixture was left under stirring for further 3 hours. Once stopped agitation, the reaction mixture was centrifuged for 30 minutes at 4000 rpm to harvest the formed nanoparticles, that were then washed twice with ethanol to remove the unreacted precursors, and finally re-suspended in 1 ml of ethanol. This suspension was subjected to a further brief centrifugation in order to separate the particles of size greater than 120 nm from the supernatant, that was recovered in the form of a colloidal solution of iridescent pink colour. This colloidal solution was centrifuged at 13400 rpm for 5 minutes, re-suspended in 0.5 ml of milliQ water, sonicated for 5 minutes and subjected to lyophilization overnight. It was so obtained a pink powder that remains stable for approximately 1 year if stored in the dark at a temperature of 10° C.

The same preparation described above was repeated also with aggregates of gold seeds and polylysine 1-5 kDa, polylysine 4-15 kDa, polylysine 70-130 kDa, and polylysine 15-30 kDa modified with the fluorescent probe Alexa680, prepared in analogous way to what described in Examples 1 and 2.

EXAMPLE 4

Calcination of Hollow Nanoparticles with Metal Aggregates

The pink powder obtained as described above in Example 3 was subjected to cycles of subsequent calcination steps according to the following scheme: calcination at 200° C. for 2 hours, then at 400° C. for 1 hour and finally at 600° C. for 2 hours. The resulting purple powder was formed by silica hollow nanoparticles having a single gold sphere inside the cavity.

EXAMPLE 5

Characterization of the Products Obtained in Examples 1-4

Figure 1:
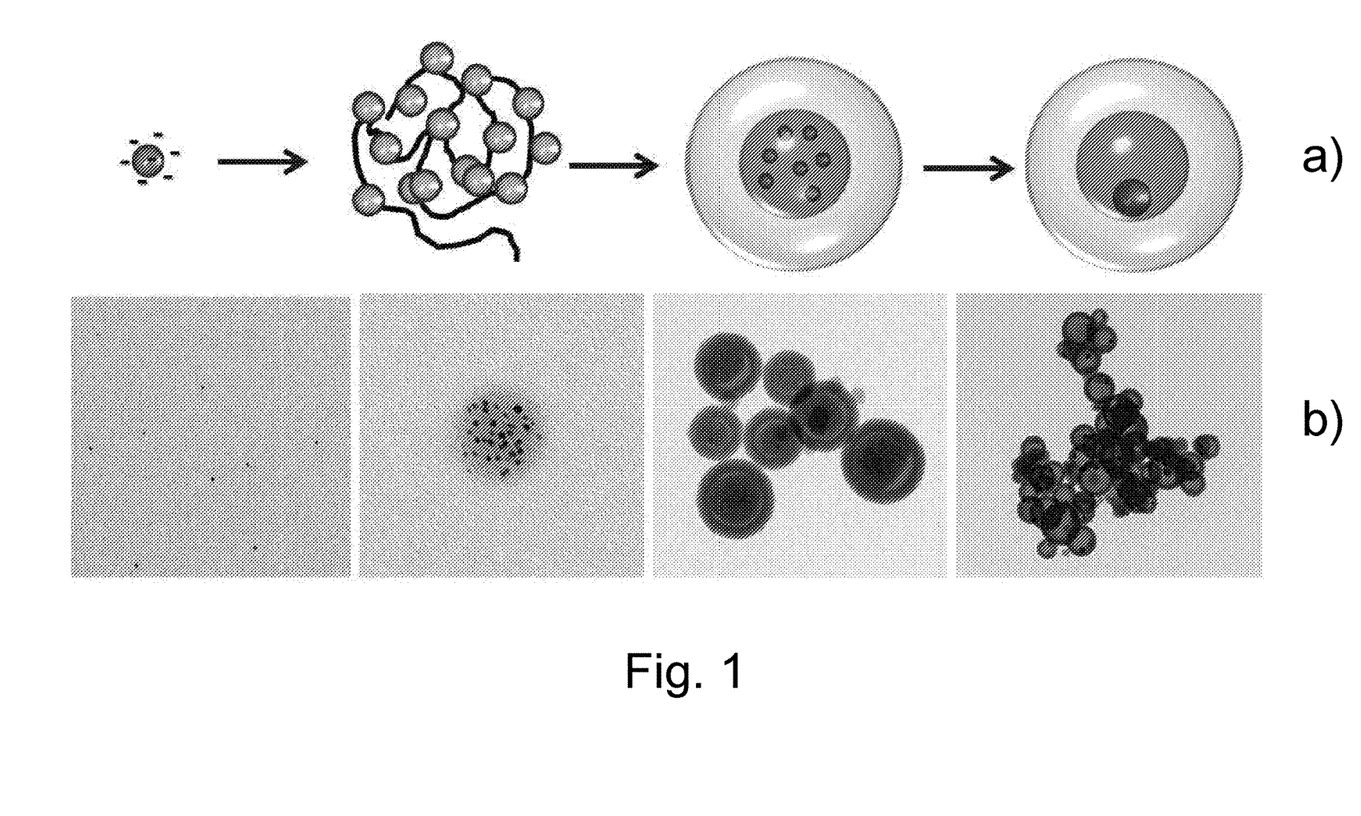

The hollow silica nanoparticles having the aggregates of metal seeds in the cavity have been analyzed by scanning electron microscopy (SEM) and by transmission electron microscopy (TEM), and the same was for the intermediate products, i.e. for the metal seeds and the aggregates of the seeds with polylysine, and for the nanoparticles after calcination. The so obtained TEM micrographies are illustrated in sequence in the FIG. 1, lower part. These analyses allowed to verify the products that actually form in the process of the invention showing, moreover, as the metal seeds in the form of aggregates are completely internalized in the silica hollow spheres.

Figure 2:
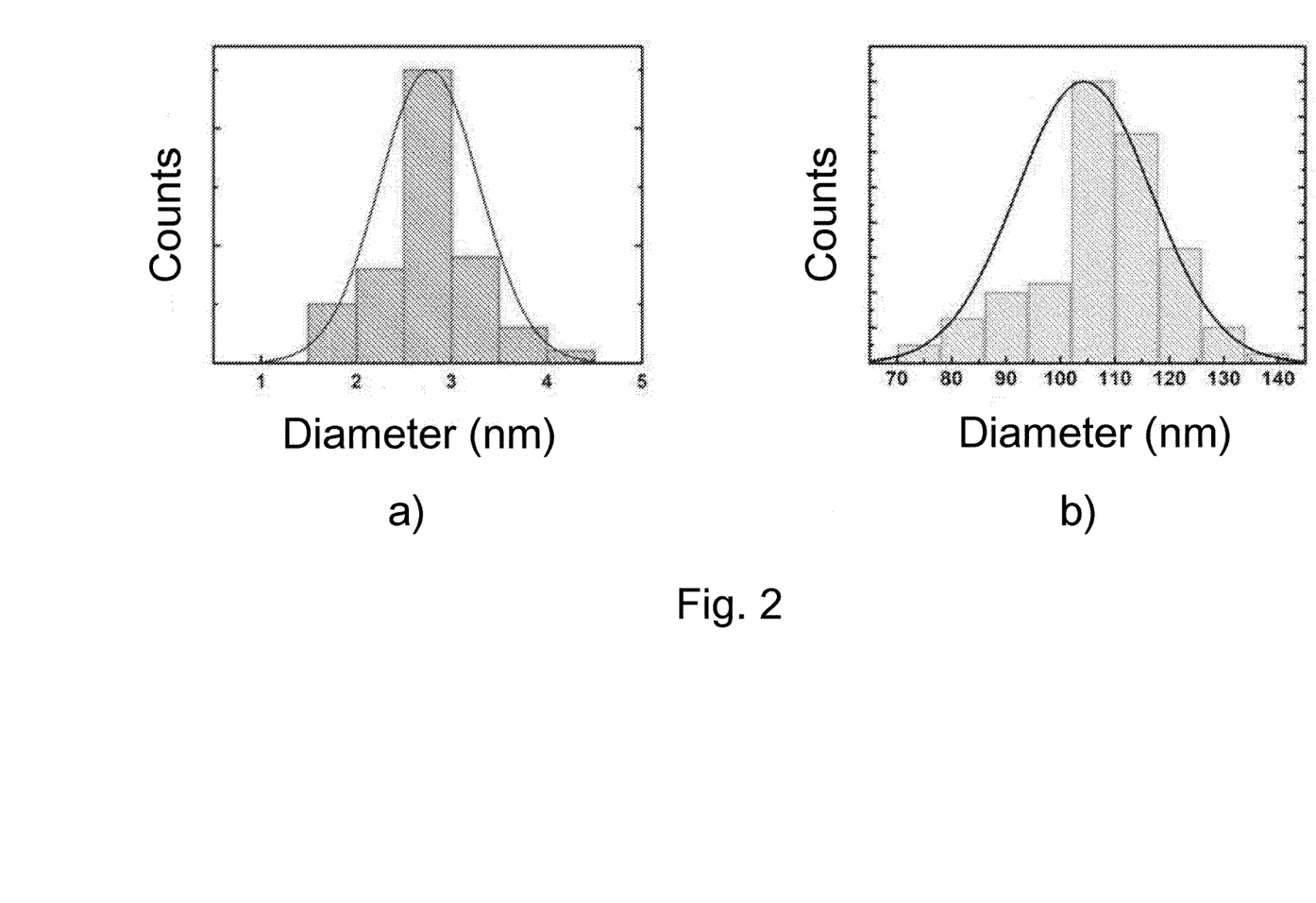

The gold seeds of Example 1 and the silica hollow nanoparticles of Example 3 prepared with polylysine 15-30 kDa were subjected to statistical analysis of the diameters obtained from the TEM images, achieving the diameters distribution shown in FIG. 2, where it is evident how the process of the invention allows to control the size of the seeds as well as the size of the hollow nanostructure containing them.

Figure 3:
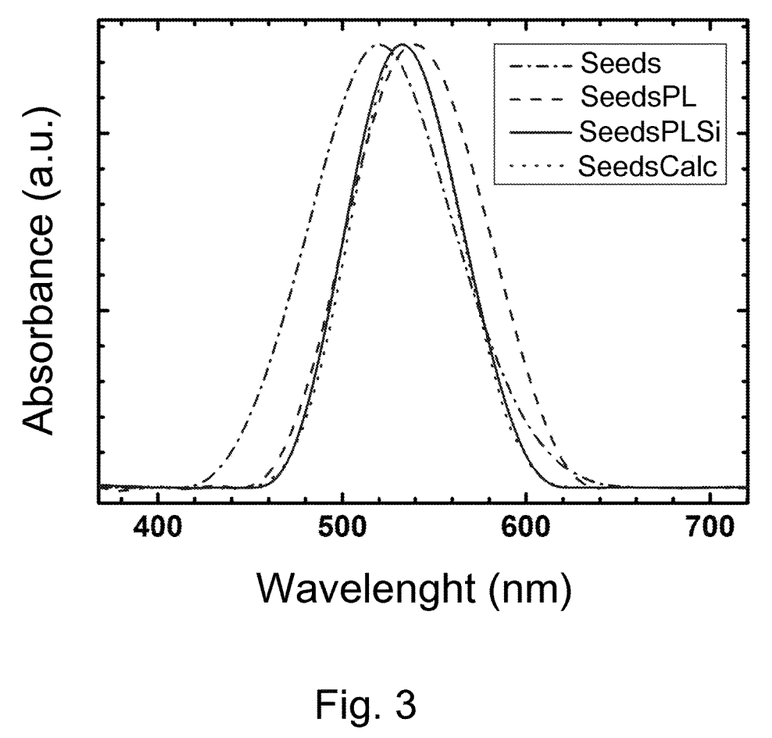

For saline phosphate buffer (PBS) aqueous solutions at pH 7.4 of the gold seeds, of their aggregates with polylysine 15-30 kDa, of the hollow nanoparticles before and after calcination, the UV-Visible absorption spectra have been recorded, shown in FIG. 3. It can be seen how the plasmon band of gold shifts toward the red when going from the metal free seeds to the seeds aggregated with polylysine, a sign that the seeds are kept strictly packed by the polyelectrolyte; this phenomenon is also observed for the hollow nanostructures containing the aggregates, indicating that the packaging of the gold seeds is retained even after the formation of the shells of silica; furthermore, after calcination, a single sphere of gold is obtained, which has the expected plasmon properties, wholly similar to those of the aggregated seeds. This latter information represents a further confirmation that the seeds, in the form of aggregates, are tightly packed among each other, so as to have characteristics quite similar to those of a single sphere of gold.

Figure 4:
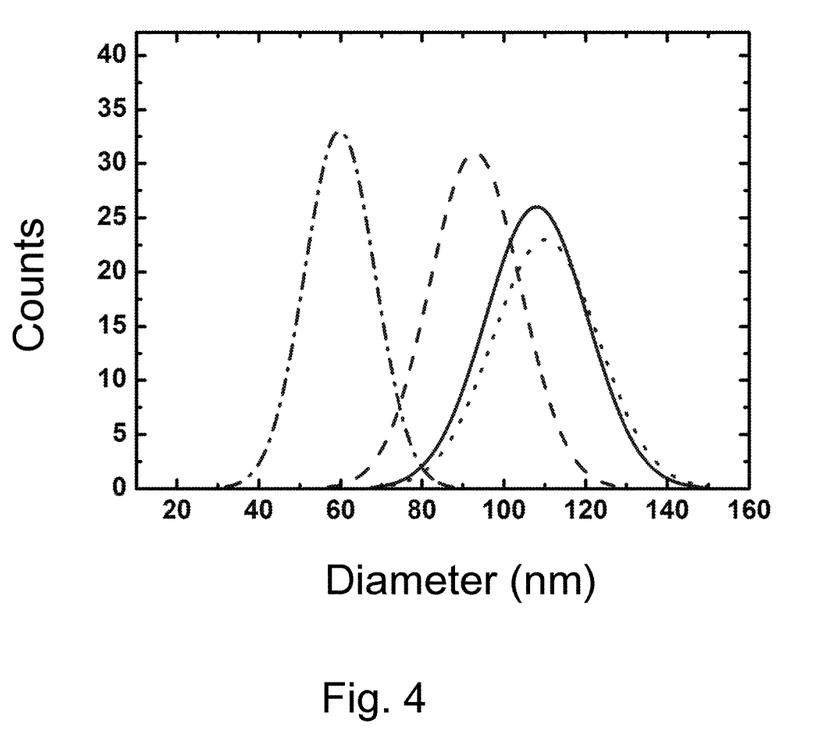

A comparative analysis of the distribution of diameter of the nanostructures formed in the present process was carried out by statistical analysis of the diameters obtained from the TEM images of the several final nanoparticles obtained with polylysine of different molecular weight. The results of these measurements, illustrated in FIG. 4, show how the present process allows modulating the final size of the nanoparticles by using polylysine of different length to aggregate the metal seeds in the core.

Figure 5:
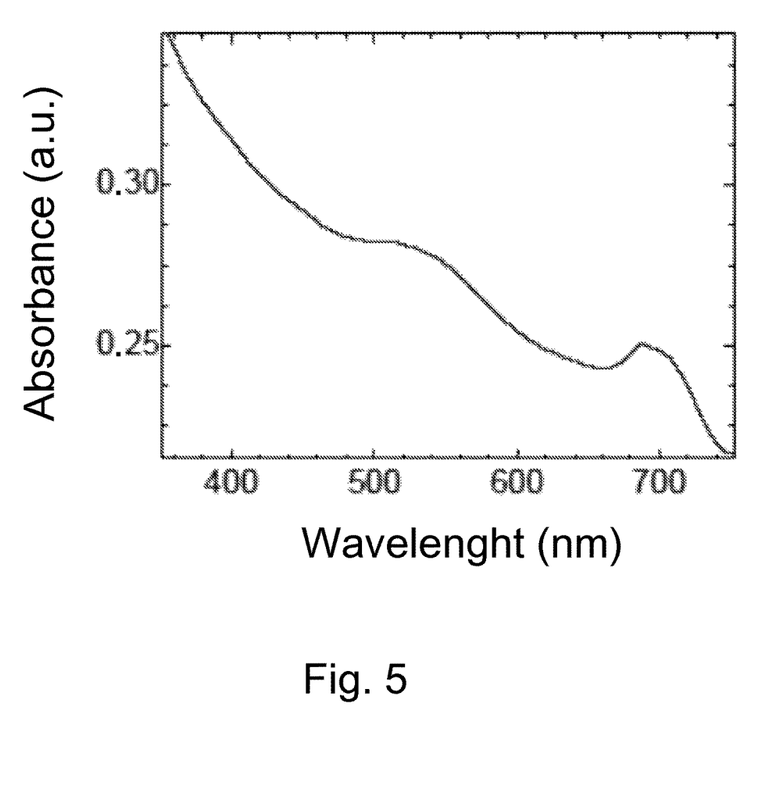
Figure 6:
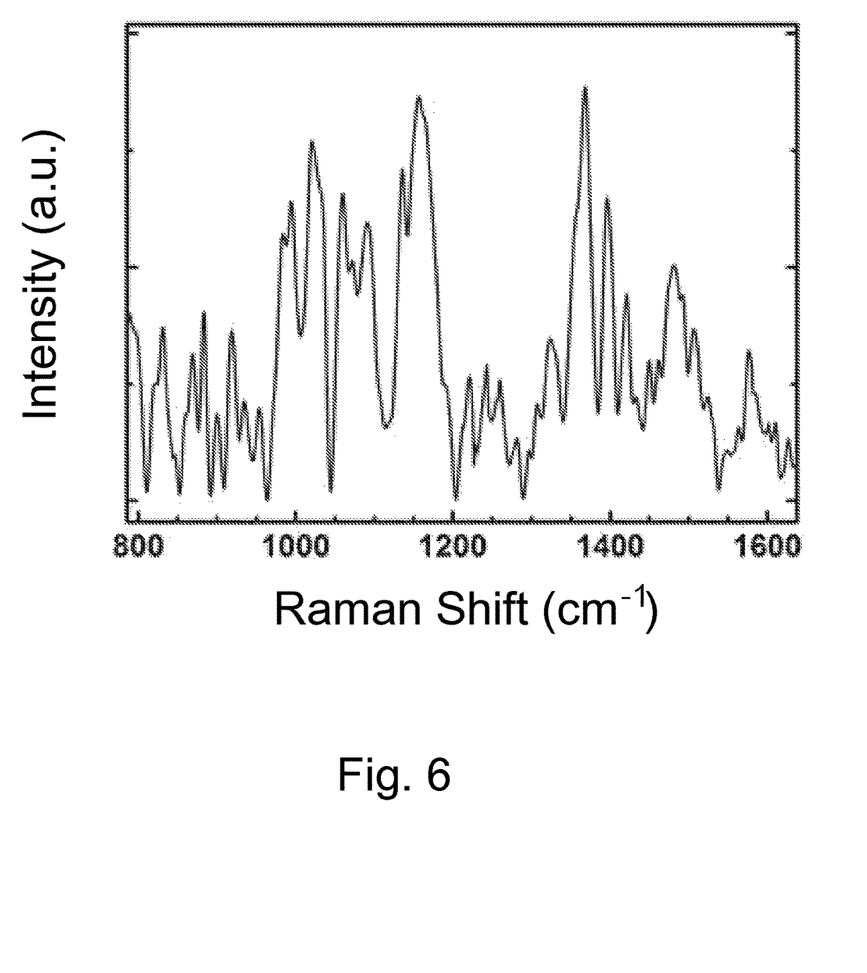

The extinction and SERS spectra of the silica hollow nanoparticles with aggregates of polylysine 15-30 kDa modified with a fluorescent probe, respectively illustrated in the FIGS. 5 and 6, show how in the final nanoparticles the fluorophore of the probe is only inside, indicating that the aggregates of polylysine, also when modified, are completely internalized in the cavity of the silica nanoparticle. The Raman signal recorded in the SERS spectrum is in fact visible also when the polylysine is modified, to indicate that the fluorophore is in the close proximity of the metal surface.

The invention claimed is:

1. A process for the preparation of hollow silica nanoparticles, having size ranging between 30 and 500 nm and a metallic core inside their cavity comprising metal seeds in the form of an aggregate, each of said seeds having size equal to or lower than 6 nm, said process comprising the following steps:
   i) synthesizing of metal seeds in the form of a complex with an aromatic anionic polyelectrolyte by reduction with sodium borohydride of a salt or of an acid of said metal in aqueous solution in the presence of said anionic polyelectrolyte;
   ii) synthesizing of an aggregate with a cationic polyelectrolyte having amino or ammonium groups of said seeds of a metal, by addition of an aqueous solution of said cationic polyelectrolyte to the aqueous solution of seeds of a metal as obtained in step i); and
   iii) forming of said hollow silica nanoparticles having in their cavity a metallic core comprising said seeds of a metal in the form of an aggregate by ammonia-catalysed hydrolysis of tetraethyl orthosilicate in a mixture of ethanol and water in the presence of said aggregate as obtained from step ii).

2. The process according to claim 1, wherein said metal is selected from the group consisting of gold, silver, and platinum.

3. The process according to claim 1, wherein said metal is gold.

4. The process according to claim 1, wherein said anionic polyelectrolyte is polystyrene sulphonate.

5. The process according to claim 1, wherein said cationic polyelectrolyte is polylysine.

6. The process according to claim 5, wherein said polylysine has a molecular weight of 15-30 kDa.

7. The process according to claim 1, wherein said cationic polyelectrolyte is a polyelectrolyte modified up to 10% of its weight with one or more functional molecules.

8. The process according to claim 1, further comprising a step of modification and/or functionalization of the outer surface of said silica nanoparticles with one or more molecules.

9. The process according to claim 1, further comprising a lyophilization step of the silica nanoparticles as obtained in step iii).

10. An intermediate in the process for the preparation of nanoparticles as defined in claim 1, consisting of an aggregate of seeds of a metal in the form of a complex with an aromatic anionic polyelectrolyte, said seeds being rolled in said aggregate with a cationic polyelectrolyte with amino or ammonium group.

11. Hollow silica nanoparticles obtainable by the process for the preparation of nanoparticles as defined in claim 1, having size ranging between 30 and 500 nm and a metallic core inside their cavity comprising seeds of a metal in form of a complex with an aromatic anionic polyelectrolyte, each of said seeds having size equal to or lower than 6 nm, in the form of an aggregate with a cationic polyelectrolyte having amino or ammonium groups.

12. The nanoparticles according to claim 11, having size ranging between 60 and 110 nm and a core inside their cavity comprising seeds of a metal, each of said seeds having size ranging between 3 and 4 nm.

13. The intermediate according to claim 10 or the nanoparticles according to claim 12, wherein said metal is gold, said anionic polyelectrolyte is polystyrene sulphonate and said cationic polyelectrolyte is polylysine.

14. The process according to claim 7, wherein the functional molecules are fluorophores or pharmaceutically active molecules.

15. The process according to claim 8, wherein said molecule is selected from the group consisting of antibodies, aptamers, fluorophores, proteins, polymers and silanizating peptides.

* * * * *